(12) United States Patent
Iyer

(10) Patent No.: US 11,614,067 B2
(45) Date of Patent: Mar. 28, 2023

(54) METHOD AND DEVICE FOR CONVERTING WAVE MOTION TO USABLE ENERGY

(71) Applicant: Narayan R Iyer, Cedar Rapids, IA (US)

(72) Inventor: Narayan R Iyer, Cedar Rapids, IA (US)

( * ) Notice: Subject to any disclaimer, the term of this patent is extended or adjusted under 35 U.S.C. 154(b) by 0 days.

(21) Appl. No.: 17/303,959

(22) Filed: Jun. 10, 2021

(65) Prior Publication Data

US 2021/0301778 A1    Sep. 30, 2021

(51) Int. Cl.
*F03B 13/20*    (2006.01)
*B63B 35/44*    (2006.01)

(52) U.S. Cl.
CPC ...... *F03B 13/20* (2013.01); *B63B 2035/4466* (2013.01); *F05B 2240/931* (2013.01); *F05B 2250/42* (2013.01); *Y02E 10/30* (2013.01)

(58) Field of Classification Search
CPC ............ F03B 13/20; B63B 2035/4466; F05B 2240/931; F05B 2250/42; F05B 2240/40; F05B 2250/72; Y02E 10/30
See application file for complete search history.

(56) References Cited

U.S. PATENT DOCUMENTS

| 8,826,658 B2 | 9/2014 | Foster et al. | |
| 9,309,860 B2 | 4/2016 | Hon | |
| 2011/0042954 A1* | 2/2011 | Werjefelt | F03B 13/20 290/53 |
| 2011/0057448 A1 | 3/2011 | Page | |
| 2012/0001431 A1* | 1/2012 | Smith | E02B 17/0004 290/53 |

FOREIGN PATENT DOCUMENTS

EP    3480452 B1 *    8/2021    ............. B63B 35/58

* cited by examiner

*Primary Examiner* — Michael C Zarroli

(57) ABSTRACT

The present disclosure provides a method and a device for converting the alternating motion produced by at least one float (202, 222) resting atop surface of a water body into unidirectional motion and converting that motion into usable energy. The method and device may be provided on a structure/vessel (206) or as the interface between the vessel and the water body surface. The vessel incorporating the device as such experiences a reduced effect of vertical perturbations from waves generated on the water body.

26 Claims, 6 Drawing Sheets

100

---

Providing an array of floats above a surface of a body of water, each float in the array being connected to a vessel or structure by a pivot.
102

↓

In response to a vertical perturbation in the water body surface, allow each float in the array to move in an alternating pattern with respect to the pivot and thus with respect to the vessel or structure
104

↓

Convert the alternating motion of each float in the array to unidirectional motion using a corresponding array of Alternating to Direct Motion Converters, ADMCs, which form part of a link between the array of floats and the common vessel or structure.
106

↓

Generate useful kinetic energy from the converted unidirectional motion and pass the energy to storage apparatus or further conversion apparatus for re-use.
108

FIG. 1

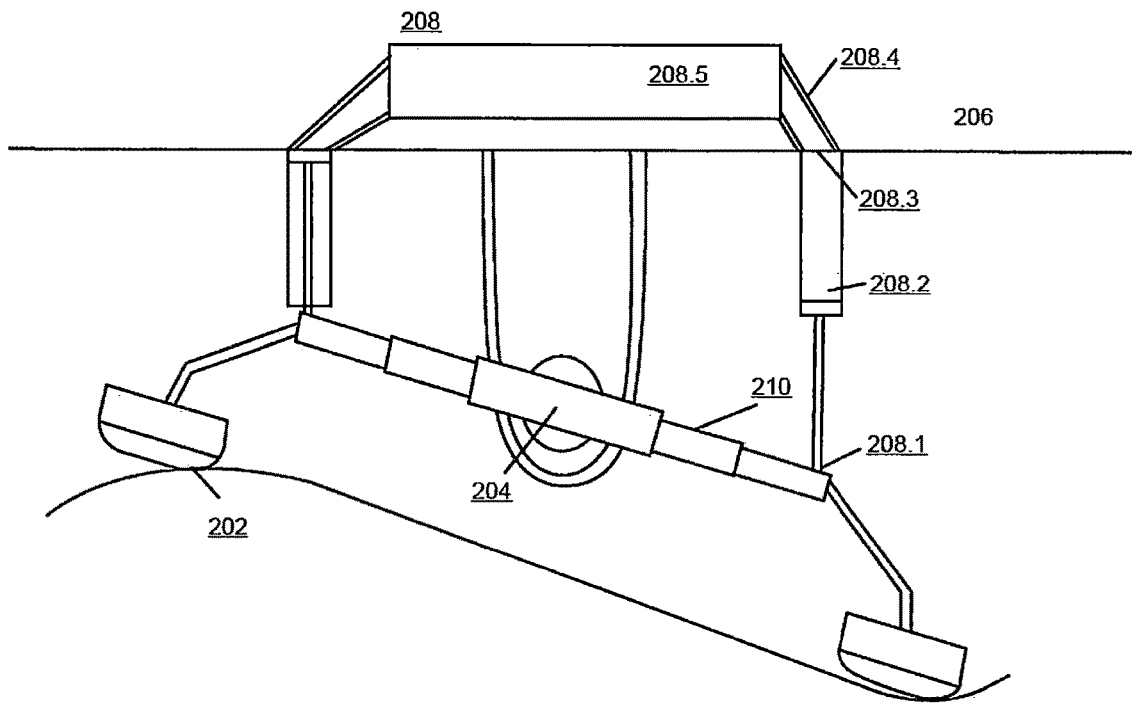
FIG. 10
(Amended)
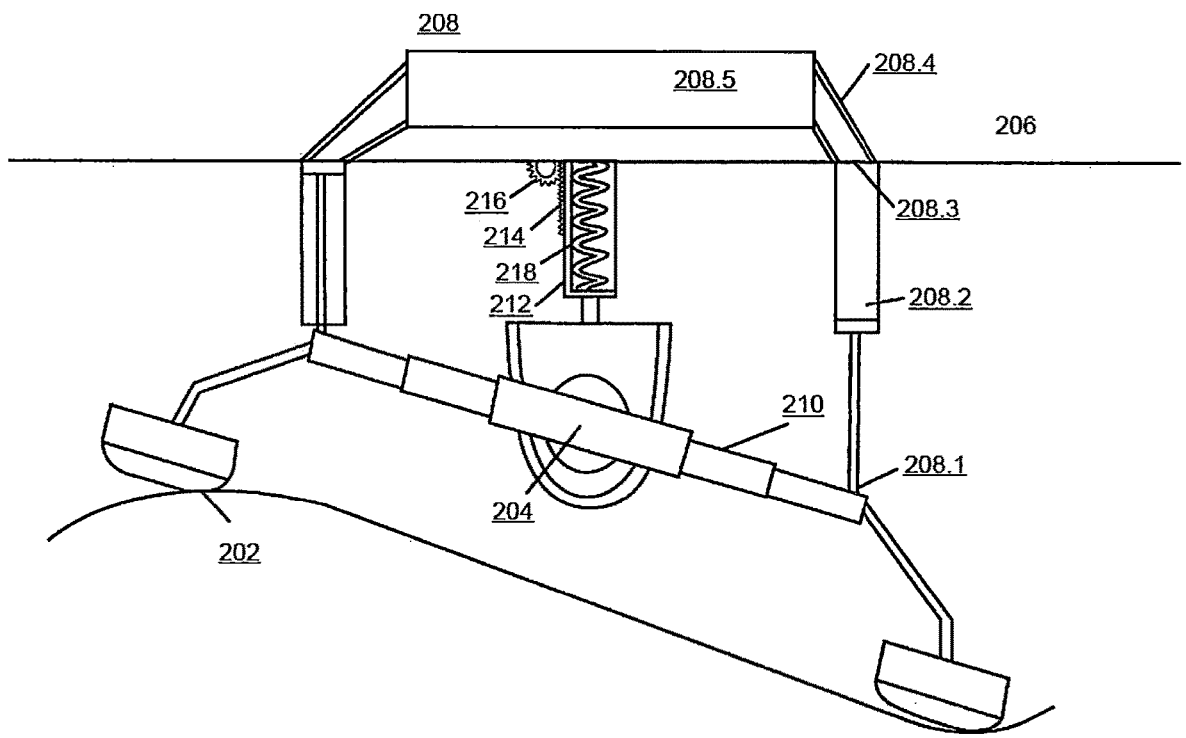
FIG. 11
(Amended)

METHOD AND DEVICE FOR CONVERTING WAVE MOTION TO USABLE ENERGY

CROSS REFERENCES TO RELATED APPLICATIONS

The present application claims the benefit and priority of U.S. application No. 63/199,936, filed 3 Feb. 2021, U.S. application No. 63/200,016 filed 9 Feb. 2021, and U.S. application No. 63/200,118 filed 16 Feb. 2021.

FIELD OF INVENTION

The present invention relates generally to the field of wave motion energy harvesting. More specifically, the present invention relates to use of at least one float connected to a vessel or structure by corresponding pivots and at least one corresponding alternating to direct motion converter to generate usable energy.

BACKGROUND OF THE INVENTION

It is widely known that wave power is an abundant but largely untapped clean energy resource that has thus far remained untapped due to the expense of such endeavours, since any structure built to harvest wave energy suffers extreme environmental conditions and wear.

Many attempts have been made to provide a solution to the foregoing issues, with submerged reactors for converting the wave motion to usable energy being popular due to the lower level of damage suffered beneath the surface. For example, U.S. Pat. No. 8,826,658 describes a point absorbing wave energy harvesting device which comprises a body that converts and stores wave energy obtained from a buoyant float connected to it which rests at the surface while the main body remains submerged under the water.

Some solutions have also attempted to provide energy conversion at the surface by anchoring surface-based wave motion generators to the seabed beneath such as the device described in WO2014089983. Such solutions are naturally expensive to install as they require secure anchorage to a seabed that could be many hundreds of meters below the surface.

Another problem relevant to the present invention is that wave motion at a water body surface, in particular the vertical aspect of the surface perturbations, affects vessels which pass through the perturbations. The vertical perturbations both cause discomfort to passengers of such vessels and hinder the progress of the vessels by providing additional water resistance and effectively increasing the distance the vessel must travel over the water body surface. It is within this context that the present invention is provided.

SUMMARY OF THE INVENTION

The present disclosure provides a method and related device for converting the alternating motion produced by at least one float resting atop the surface of a water body into unidirectional motion and converting that motion into usable energy. The methods and devices may be provided on a structure that is anchored to solid earth, a structure that is tethered to solid earth and/or as the interface between a vessel and the water body surface; the term "structure" hereon refers to either application. A vessel incorporating the device as such may experience a reduced effect of vertical perturbations from waves of the water body.

Thus, according to one aspect of the present disclosure there is provided a method of converting wave motion to usable energy. The method includes the steps of arranging at least one float on a surface of a water body, each of the at least one float connected with a structure by a pivot and being configured to move in an alternating pattern with respect to the pivot in response to vertical perturbation of the surface of the water body, with one or more float elements (portions of a float or, one or more whole floats) occurring on both sides of said pivot, causing alternating buoyancy forces on either side of the pivot, and converting alternating movement of each of the at least one float to a unidirectional motion using at least one corresponding Alternating to Direct Motion Converter, ADMC, forming part of a mechanism connecting the at least one float and the structure.

According to another aspect of the present disclosure there is provided a device for converting wave motion to usable energy. The device includes at least one float connected with a structure by a pivot, the at least one float being arranged above a surface of a water body and configured to move in an alternating pattern with respect to the pivot in response to vertical perturbation of the surface of the water body causing alternating buoyancy forces on either side of the pivot, and at least one Alternating to Direct Motion Converter, ADMC, forming part of a mechanism connecting the at least one float and the structure, the at least one ADMC adapted to convert alternating movement of each of the at least one float to a unidirectional motion.

In an embodiment, the method further includes a step of transmitting, by a power transmitting unit, the converted unidirectional motion to any of a storage apparatus and a conversion apparatus for re-use.

In some embodiments, the at least one float includes one or more pairs of linked floats, each pair of the linked floats being connected to the structure about a common pivot for that link to create alternating rotational motion about the common pivot in response to the vertical perturbation of the surface of the water body that affects each float in the pair of linked floats in succession.

In an embodiment, each float of the pair of linked floats is connected to the common pivot by a variable length arm adjustable in length such that separation between the floats of the pair of linked floats is controlled corresponding to wavelength of the vertical perturbation of the surface of the water body to maximize rotational motion induced about the common pivot.

In an embodiment, the method further includes the steps of determining, by a sensor, the wavelength and amplitude of the vertical perturbation of the surface of the water body, calculating an optimal float separation, and adjusting the float separation to match the optimal float separation.

In some embodiments, the common pivot is connected to the structure by at least one compressible element to harvest translational motion of the common pivot relative to the structure due to the vertical perturbation of the surface of the water body.

In an embodiment, the at least one compressible element comprises any of a spring mechanism and a hydraulic mechanism storing potential energy created by each compression in order to extend and return the common pivot to an original vertical position once the vertical perturbation of the surface of the water body is passed.

In an embodiment, each of the at least one compressible element is oriented to maximize motion of the common pivot with respect to the structure based on one or more environmental conditions.

In an embodiment, one or more linked pairs of the at least one float include a third float connected directly to the common pivot to extract energy from translational vertical motion due to the vertical perturbation of the surface of the water body.

In some embodiments, the at least one float includes a subset of floats individually connected to corresponding pivots with length spanning both sides of the pivots. In some embodiments, the said pivot is connected to the structure by the at least one compressible element to harvest translational motion generated thereof.

In an embodiment, the structure is a transportation vessel traversing the water body.

In an embodiment, the at least one float provided on the structure is fitted on a frame having a set of connections of adjustable length between an adjacent float for controlling separation between the floats.

In some embodiments, the at least one float is detachable from the frame to facilitate adaptation of the at least one float to different weights and conditions.

In an embodiment, the method further includes a step of transmitting, by the power transmitting unit, the converted energy through a flywheel element to store as usable unidirectional kinetic energy for input of a generator.

In an embodiment, the vessel includes an appendage on an underside thereof, the appendage having a buoyant element to increase total buoyancy of the vessel.

In some embodiments, the method and the device may be applied on a transportation vessel with an electric or electric hybrid engine which uses the converted energy to recharge batteries used or deployed on the vessel. In other embodiments, the method and the device may be applied on a transportation vessel with a non-hybrid engine for powering vessel's electronic systems.

In some embodiments, the method and the device is applied on a transportation vessel and the at least one float is further configured to reduce vertical perturbations experienced by the vessel as a result of vertical perturbations in the surface of the water body.

BRIEF DESCRIPTION OF THE DRAWINGS

Various embodiments of the invention are disclosed in the following detailed description and accompanying drawings.

FIG. 1 illustrates a flow diagram of a core set of steps of the disclosed method for converting alternating wave motion energy to usable unidirectional motion.

FIG. 10 illustrates an example configuration of a hydraulic ADMC being used to carryout the disclosed method.

FIG. 11 illustrates another example configuration of a hydraulic ADMC being used to carryout the disclosed method.

Figure 2:
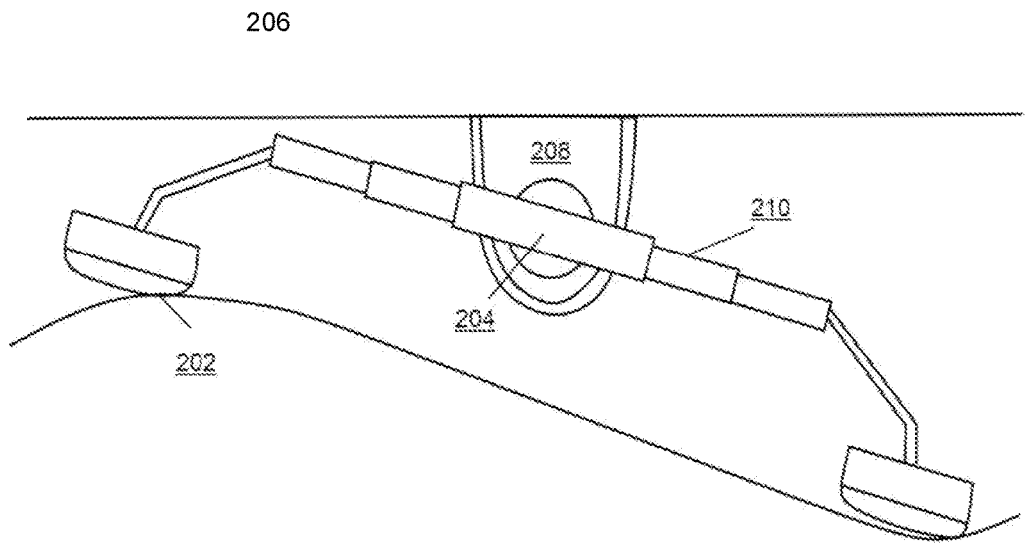
FIG. 2 illustrates a first example configuration of a float assembly for carrying out the disclosed method.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present disclosure provides a method of operating at least one float (defined herein as any buoyant body capable of physically interfacing with the surface of a body of water with the purpose of providing buoyancy) which are connected by at least one corresponding Alternating to Direct Motion Converters (ADMCs) to a vessel or structure.

If the method of the present disclosure is applied on a vessel, in particular a maritime vessel likely to be traversing waves on a regular basis, with the floats interfacing with the water surface and supporting its weight instead of the hull of the vessel, energy can be harvested from the vertical perturbations experienced by the floats while at the same time reducing water resistance and effective distance travelled by the vessel, and simultaneously reducing the vertical perturbations experienced by occupants of the vessel.

Alternatively, the at least one float can act as a simple energy harvesting facility which can be mounted to any structure connected to the earth, such as for example the underside of any above-water structure anchored to the shore such as a pier.

Referring to FIG. 1, a flow diagram of a core set of steps of the disclosed method 100 for converting alternating wave motion energy to usable unidirectional motion is shown.

In a first step 102, the method involves arranging or providing at least one float on the surface of a water body, each float being connected to a vessel or structure by a pivot, with one or more float elements on both sides of the pivot. For the purposes of this application, a float element is either a portion of a float or a whole float. This may either mean providing pairs of linked floats connect to a given pivot such that motion of one float in the pair causes opposing motion of the other float in the pair with respect to the pivot, or could also mean a single float having a length connected to the pivot such that, similarly, motion of one end of the float with respect to the pivot causes opposing motion of the other end of the float with respect to the pivot.

As the floats are in contact with the water surface they will rise and fall in line with vertical perturbations in that surface, i.e., the vertical perturbations caused by the motion of waves passing by the floats. All vessels and ocean-based structures encounter waves on a frequent basis, meaning that placement of one or more floats at the interface between a vessel or structure and a body of water will ensure the floats are regularly moved up and down.

Generally, the floats will span the full interface between the vessel or structure body and the water surface, however there may be some examples where it is advantageous for a portion of the vessel or structure body to also interface with the water or even to be submerged. This may assist with load bearing issues for example.

In a second step 104, the method involves, in response to a vertical perturbation i.e., a wave, in the water body surface, allowing each float to move in an alternating pattern with respect to the pivot and thus with respect to the vessel or structure in one of the ways mentioned above.

The specific examples of structures suitable for achieving this are described in detail in the following sections.

In a third step 106, the method involves converting the alternating movement of each float of the at least one float to a unidirectional motion using at least one corresponding Alternating to Direct Motion Converters, ADMCs, which link the floats to the vessel or structure. There may be one ADMC per float, or one ADMC may link a plurality of floats to the body above.

At a granular level, when a wave crest hits a given float, the float will be raised vertically, conveying a rotation along a first direction with respect to a pivot connecting the float to an ADMC, then once the wave crest has passed, the float will be forcefully caused to lower due to a potential energy accumulated in the connection to the vessel or structure body (the connection will comprise some spring, hydraulic, fluid/gas compression or other elastic mechanism) (specific configurations described below). The lowering of the float to its original position will also convey kinetic energy to the ADMC but in the opposing direction or rotation, and the ADMC is configured to use both directions from the movement to propel a connected component in a unidirectional manner.

Various different types of ADMC are known in the art and suitable for fulfilling this functionality of converting the alternating wave motion from the floats at the interface between the floats and the vessel or structure. The specific details of ADMCs will not be explored in the present application, as while they fulfil a function of the invention they are not the focus, however several suitable ADMCs are disclosed in the applicant's co-pending applications U.S. 63/065,779 and U.S. 63/202,180, the contents of which are incorporated herein by reference in their entirety.

Suffice to say that for the purposes of this application, an ADMC is a mechanical and/or hydraulic arrangement that extracts energy from both directions of a bidirectional movement, either translational or rotational, and uses the extracted energy to produce unidirectional motion of either a mechanical component and/or fluid (corresponding to the hydraulic arrangement).

In a fourth step 108, the method involves using the unidirectional motion to generate kinetic energy and passing the converted energy, through a power transmission unit, to storage apparatus or further conversion apparatus, for example a generator for converting the unidirectional motion to electricity, on the vessel or structure for re-use. Any number of mechanisms are known for storing or using unidirectional motion. The electricity derived from the converted energy could for example be fed, through the a power transmission unit, directly into a grid.

One suitable example would be that the unidirectional motion obtained is used to power a flywheel on a generator or to charge a battery. The obtained unidirectional motion may be transmitted to the flywheel through the power transmission unit of the device. This could be particularly beneficial for vessels that utilise hybrid propulsion systems.

The cycle then repeats as the next vertical perturbation, i.e. the next wave, is encountered.

Referring to FIG. 2, a first example configuration of a float assembly for carrying out the disclosed method is shown.

In the first example configuration, each float 202 is linked to another float about a common pivot 204 such that vertical displacement of one float will cause opposing vertical displacement of the paired float about the pivot. A pair of such floats can be mounted on the underside of a vessel or structure 206 as described above.

A rotational ADMC 208 connects the common pivot 204 to the underside of the vessel or structure, converting the alternating rotational motion caused by passing waves into unidirectional rotation motion which, as already described, can be used to spin flywheel like mechanisms mounted above on the structure 206.

In the present example, the pairs of linked floats 202 are shown mounted on telescopic arms 210 of adjustable length. This has the advantage that the arms can be adjusted to achieve maximum vertical displacement between the two linked floats, maximum rotational displacement about the pivot, and thus maximum energy, by adjusting to separate the floats 202 by an ideal distance based on the wavelength of perturbations currently being experienced.

A local sensor may be provided at each such ADMC to determine the local wavelength and amplitude of the perturbations. Once the user has these values, the float separation can be adjusted by retracting or deploying the telescoping arms 210. The ideal state is the float separation distance that allows one float of the leg to be at a crest when the other float is at the trough.

For example, if an average perturbation amplitude is determined to equal A, and an average perturbation wavelength is determined to equal k, then the ideal length for a telescopic leg spanning half the distance between a trough and a peak of such a wave would equal:

$$L = \frac{\sqrt{4A^2 + \frac{\lambda^2}{4}}}{2}$$

Since the float assembly takes up most of the vertical perturbations, if the method is being applied on a vessel, the vessel body 206 is left with minimal vertical motion, thus allowing for a smoother ride for passengers and cargo. Additionally, since the vessel body does not face the vertical perturbations, there is a reduction in water resistance forces.

The first example configuration makes use of the relative motion between pairs of floats linked by a rigid connection, however it is also possible to extract energy from common motion of the linked floats, such as when a large swell in the water body surface causes both floats to rise in tandem. Various example configurations are proposed for harvesting energy from both kinds of motion.

Figure 3:
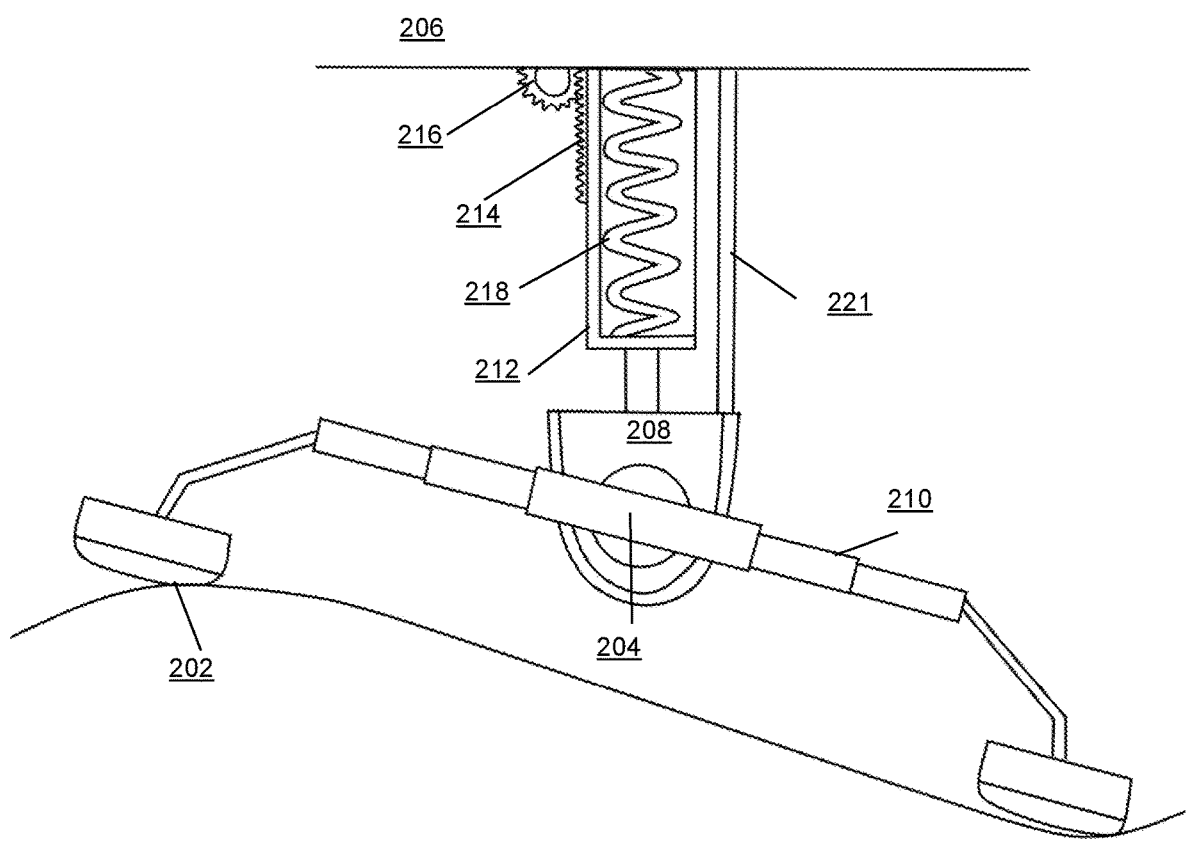
FIG. 3 illustrates a second example configuration of a float assembly for carrying out the disclosed method.

Thus, referring to FIG. 3 a second example configuration of a float assembly for carrying out the disclosed method is shown which comprises a pair of linked floats according to the first configuration but which are attached to the vessel or structure 206 by a compressible element, allowing both translational and rotational motion to be harvested from passing wave crests.

The floats may be connected to the underside of the vessel or structure 206 by a compressible element 212 which is attached to the pivot 204 such that vertical perturbations of the water surface cause direct translational motion of the float pair and compression of the element 212.

The compressible element 212 further comprises a toothed section 214 that interlocks with a gear 216 in such a way that compression of the element 212 causes vertical motion of the toothed section 214 that rotates the gear. Thus, the alternating translational motion of the float pair can be converted to bidirectional rotational motion of the gear which can then be converted to unidirectional motion on the vessel or structure body 206 by an appropriately configured ADMC that receives the motion of the gear 216 as input; this ADMC may be located within the vessel or structure.

The compressible element is also provided with a spring-like component 218 which becomes energised when the element 212 is compressed, building up potential energy which, when the vertical perturbation in the water surface has passed, causes the compressible element 212 to expand once more, causing an opposing motion in the toothed section 214 which is also transferred to the gear 216 and ADMC, and returning the float pair to its original position ready for the next wave.

A spring is merely an example of an appropriate mechanism. Anything capable of storing potential energy from the wave could also be used. A hydraulic piston containing a compressible fluid could also be used for the same function.

The structure of this configuration is also provided with a belt mechanism 221 for transferring the rotational motion of the ADMC within the common pivot 204 to the vessel or structure body 206.

Figure 4:
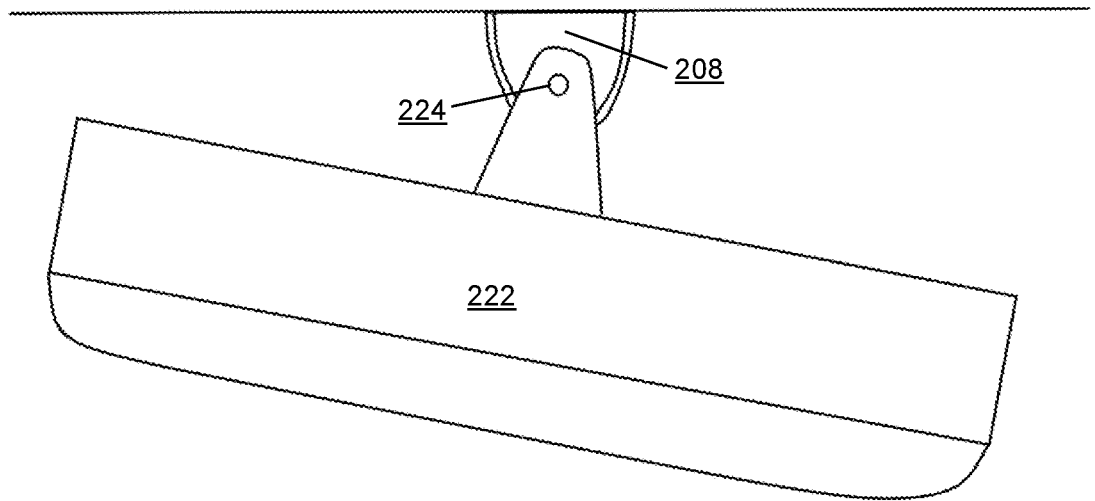
FIG. 4 illustrates a third example configuration of a float assembly for carrying out the disclosed method.

Referring to FIG. 4, a third example configuration of a float assembly for carrying out the disclosed method is shown wherein the float 202 is designed with a much larger surface area 222 to the point where it is likely to span a significant portion of the wavelength of any passing water perturbation.

As such, the float is provided with a pivot 224 to provide a rotational degree of freedom, since it will be rotated by a passing wave to a greater extent than it will be moved vertically. A rotational ADMC then connects it to the vessel or structure body 206.

Figure 5:
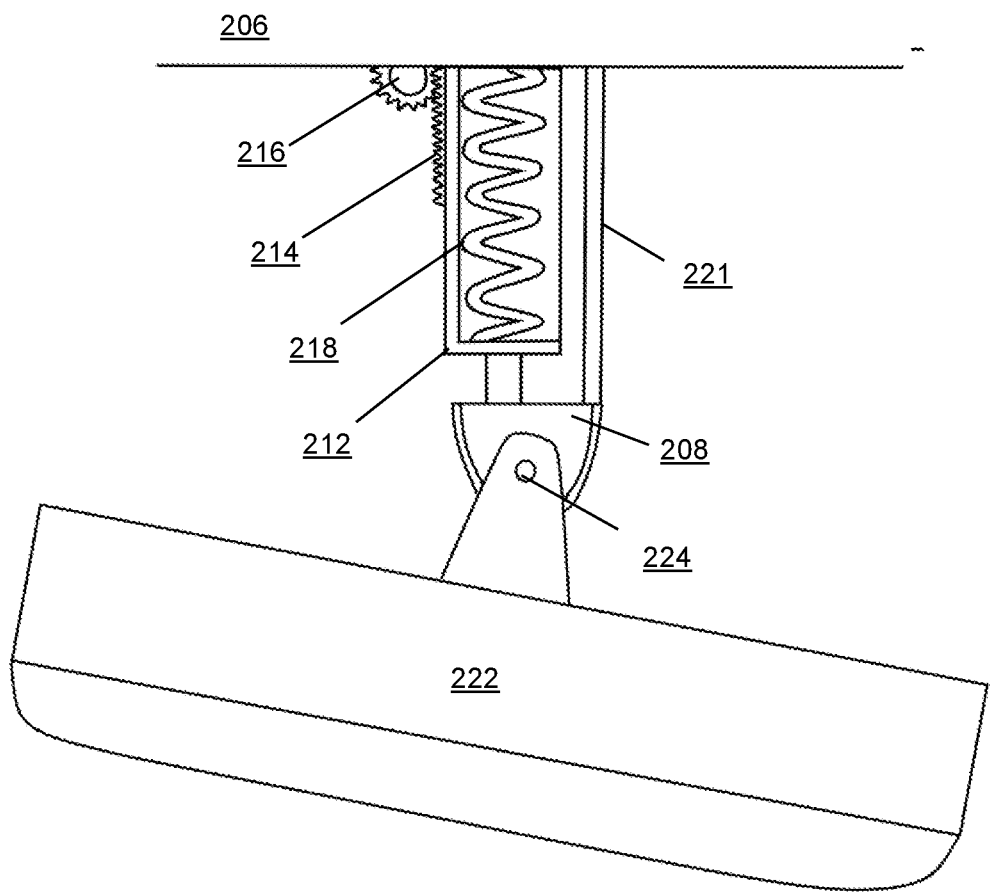
FIG. 5 illustrates a fourth example configuration of a float assembly for carrying out the disclosed method.

Referring to FIG. 5, a fourth example configuration of another hybrid float assembly for carrying out the disclosed method is shown, wherein the enlarged float of FIG. 4 has been provided with a dual motion capturing ADMC assembly similar to that of FIG. 3.

Figure 6:
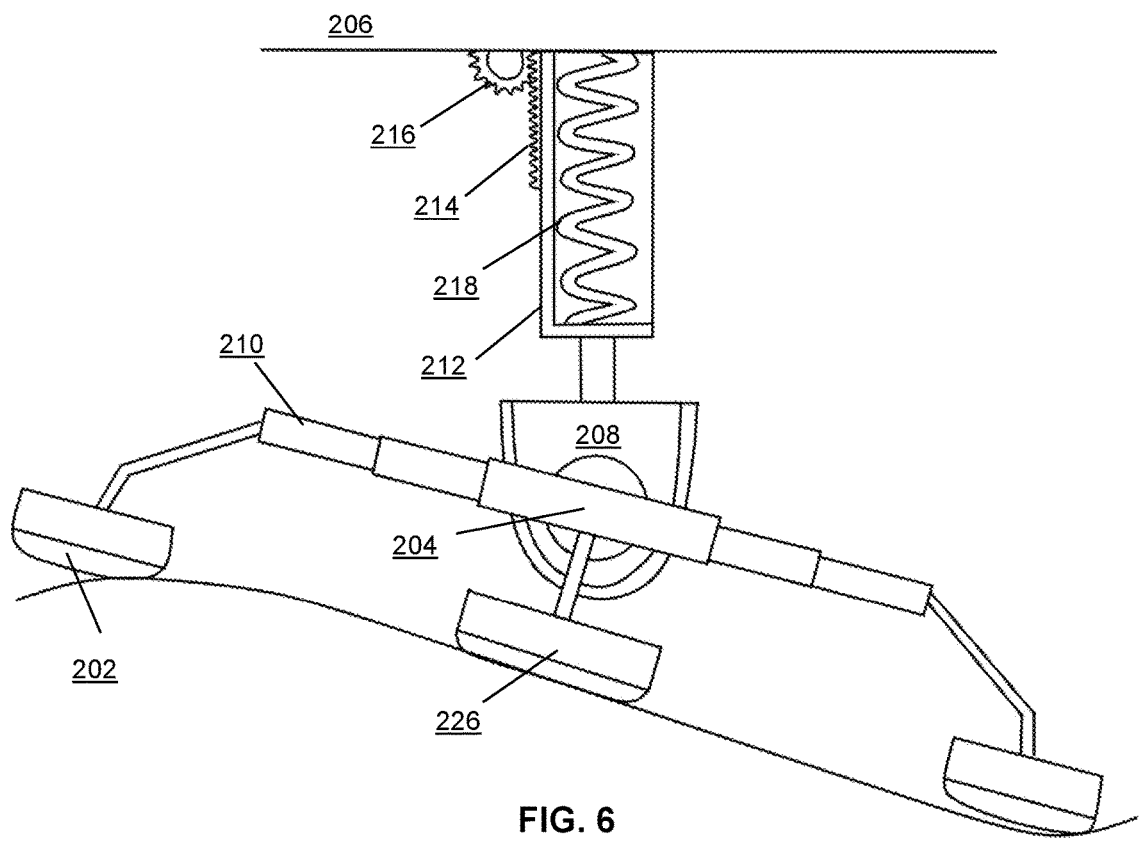
FIG. 6 illustrates a fifth example configuration of a float assembly for carrying out the disclosed method.

Referring to FIG. 6, a fifth example configuration of a float assembly for carrying out the disclosed method is shown that has been provided with a third float 226 for ensuring that all the maximum translational motion has been extracted by the ADMC in the compressible element.

Additional modifications can be made to the disclosed configuration to account for environmental factors.

Figure 7:
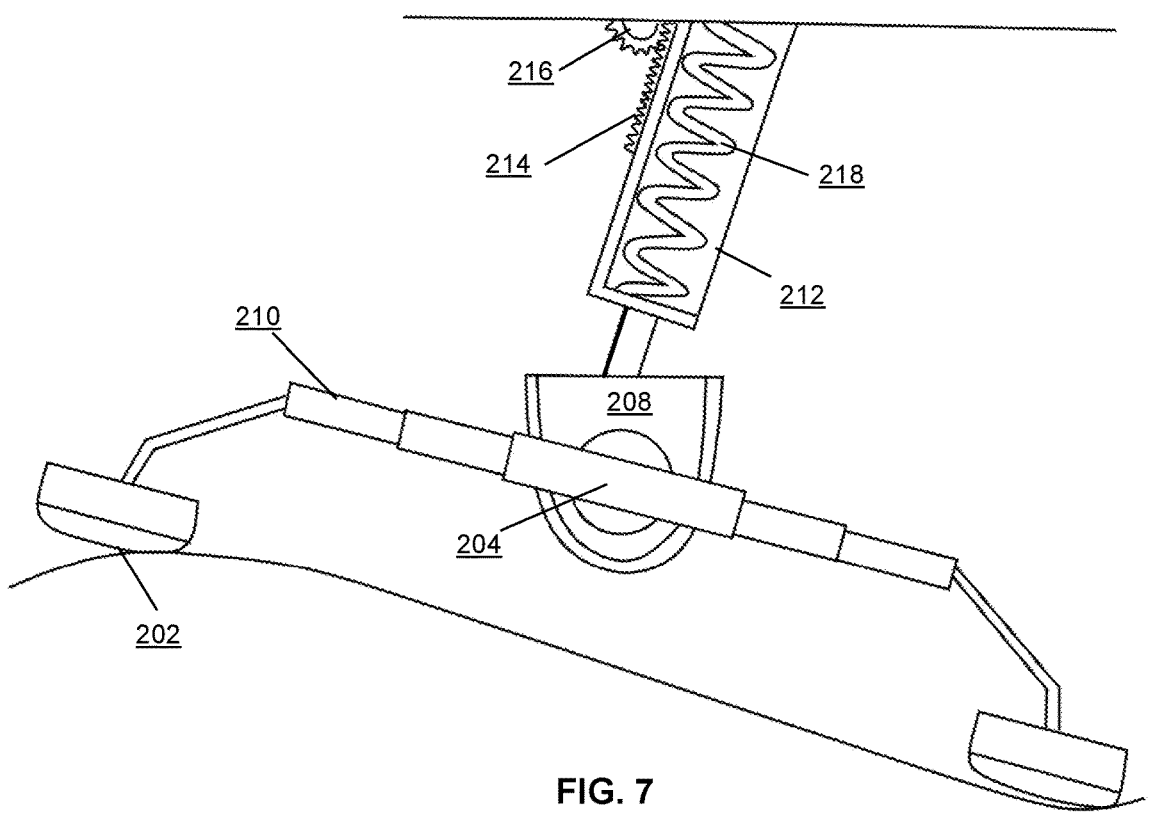
FIG. 7 illustrates a sixth example configuration of a float assembly for carrying out the disclosed method.

Referring to FIG. 7, a sixth example configuration of a float assembly for carrying out the disclosed method is shown wherein the compressible element 212 has been angled away from the vertical to capture translational motion along a different axis in order to extract some of the horizontal components of the wave force in addition to the vertical components.

This angle can be altered based on the waves in the region, for example, a steeper angle away from the vertical is better optimized for faster travel (faster relative wave motion).

While the illustration uses the base configuration of FIG. 3, this concept can be applied to any of the variations comprising a compressible element.

Figure 8:
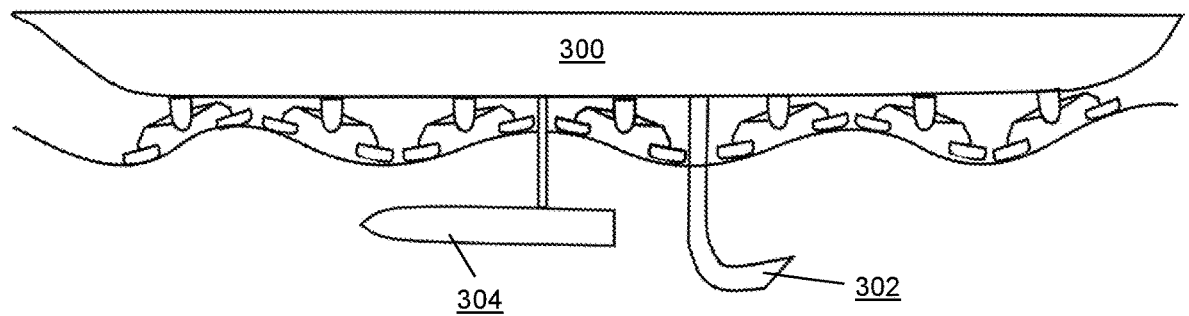
FIG. 8 illustrates an example arrangement of a vessel equipped with at least one float for carrying out the disclosed method and various other modifications.
Figure 9:
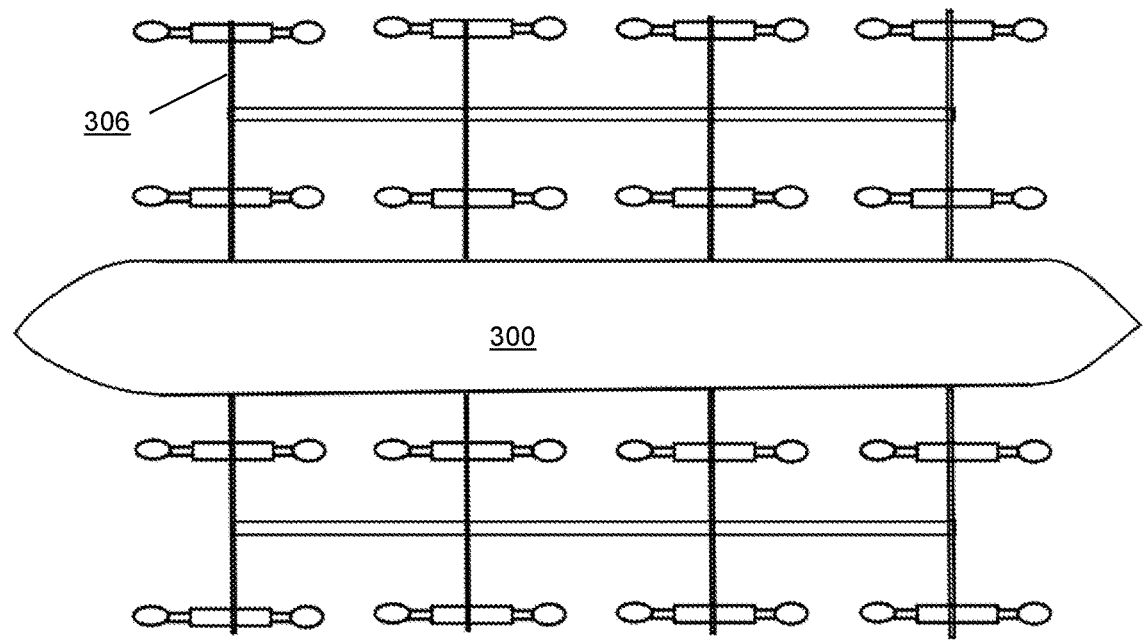
FIG. 9 illustrates an example configuration of at least one float connected to a vessel by an adjustable frame.

FIGS. 8 and 9 show actual arrangement of the above-described float configurations mounted on a vessel.

In particular, referring to FIG. 8, a vessel 300 is shown from the side traversing various perturbations on the surface of a body of water. The vessel 300 comprises one or more of linked float pairs along the lines of the first example configuration of FIG. 2 which completely span the interface between the vessel body 206 and the body of water.

As such, the vessel is further provided with an extendible propulsion system 302 that reaches down into the water in order to control the vessel navigation. The system 302 may for example be a set of propellers.

Also shown is a submerged buoyant element 304 rigidly connected to the underside of the vessel 300 and which rests under the surface of the water to help support the weight of the vessel. Element 304 is an optional feature but potentially helpful in constructions such as that illustrated where the entire weight of the vessel 300 would otherwise be resting on the floats.

If the overall system is too heavy (the floats sink), additional float systems can be added. Especially if a frame is used below the vessel body to connect the float systems to the vessel. And this method applies to all combinations of the designs.

Referring to FIG. 9, the same vessel 300 and floats is seen from a top-down view. As can be seen, the floats are mounted on a frame 306 that extends outwards either side of the vessel body for balance. The floats are all aligned in parallel to face oncoming waves such that each float in a pair will function in tandem with the other as described above.

The support frame 306 itself can be structured to allow attachment or detachment of additional float pairs or of other types of floats as described in the preceding examples. For example, if the vessel weight increases, it may be beneficial to attach additional floats to the frame 306.

Furthermore, the frame 306 may be adjustable to allow control over the separation between floats and float pairs. Indeed, the float spacing can be adjusted to account for hydrodynamic drag, wake interference, or optimize wave energy extraction based on the ship's current parameters (such as speed, weight etc) or the regional oceanic conditions.

FIG. 10 and FIG. 11 are examples of Hydraulic ADMC arrangements for carrying out the disclosed method. This example comprises of an alternating pressure source 208.2, such as a piston for example, that is connected to oppositely configured check valves (one-way valves) that are further connected to conduits 208.4, which can further convey fluid to a system 208.5 that comprises of additional conduits and/or pressure reservoirs in order to produce unidirectional fluid flow. The connection 208.1 of the alternating pressure source to the float system (linking arm and/or float) may comprise one or more revolute joints, rigid joints and/or sliders. The connection 208.3 of the alternating pressure source to the vessel or structure may comprise one or more revolute joints, rigid joints and/or sliders.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the method and related devices for converting wave motion to usable energy have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of converting wave motion to usable energy, the method comprising the steps of:
   providing a first float (202) that is connected with a second float;
   providing a common pivot (204) that is connected with the first float and the second float;
   wherein the connection between the first float and second float is such that an upward displacement of the first float relative to the common pivot causes a downward displacement of the second float relative to said pivot;
   wherein an upward displacement of the second float relative to said pivot causes a downward displacement of the first float relative to said pivot;
   wherein at least one of said upward displacements is caused by wave motion; and
   providing a system to convert a multidirectional form of kinetic energy to a unidirectional form of kinetic energy.

2. The method according to claim 1, wherein said multidirectional to unidirectional conversion system is an Alternating to Direct Motion Converter, ADMC (208), and further comprising the step of transmitting the converted unidirectional motion to any of a storage apparatus and a conversion apparatus for re-use.

3. The method according to claim 1, further comprising the step of providing an adjustable length arm (210) that forms a connection between the common pivot and at least one of the first float and the second float.

4. The method according to claim 3, further comprising the steps of:
   determining, using at least one sensor, wave conditions;
   calculating a float separation between the first float and the second float; and
   adjusting the adjustable arm to correspond to the calculated float separation.

5. The method according to claim 1, wherein the common pivot (204) is connected to a structure (206) by at least one compressible element (212) to harvest translational motion of the common pivot (204) relative to the structure (206) due to wave motion.

6. The method according to claim 5, wherein the at least one compressible element (212) comprises any of a spring mechanism and a hydraulic mechanism storing potential energy created by each compression in order to extend and return the common pivot (204) to an original vertical position once the vertical perturbation of the surface of the water body is passed.

7. The method according to claim 5, wherein the at least one compressible element (212) is oriented with respect to the structure (206) to vary the motion of the common pivot (204) based on one or more environmental conditions.

8. The method according to claim 1, wherein a plurality of said pivots, each pivot connected with two corresponding floats, is connected with a common structure.

9. The method according to claim 8, wherein all the floats connected with said plurality of pivots, in combination, contributes buoyancy to keep the structure afloat.

10. The method according to claim 8, wherein the structure is a vessel.

11. The method according to claim 8, wherein plurality of pivots is provided on the structure (206) is fitted on a frame (306) having a set of connections of adjustable length between an adjacent pivot for controlling separation between the pivots.

12. The method according to claim 8, wherein at least one pivot and its corresponding two floats, in combination, is detachable from a frame (306) to facilitate adaptation of the structure (206) to different weights and conditions.

13. A device for converting wave motion to usable energy, the device comprising:
   a first float (202) that is connected with a second float;
   a common pivot (204) that is connected with the first float and the second float;
   wherein the connection between the first float and second float is such that an upward displacement of the first float relative to the common pivot causes a downward displacement of the second float relative to said pivot;
   wherein an upward displacement of the second float relative to the pivot causes a downward displacement of the first float relative to said pivot;
   wherein at least one of said upward displacements is caused by wave motion; and
   a system to convert a multidirectional form of kinetic energy to a unidirectional form of kinetic energy.

14. The device according to claim 13, wherein the multidirectional to unidirectional conversion system is an Alternating to Direct Motion Converter, ADMC (208) to convert alternating motion to unidirectional motion, and further comprising a power transmitting unit that transmits the converted unidirectional motion to any of a storage apparatus and a conversion apparatus for re-use.

15. The device according to claim 13, further comprising an adjustable length arm (210) that forms a connection between the common pivot and at least one of the first float and the second float.

16. The device according to claim 15, further comprising:
   a sensor, to measure wave conditions;
   a means to calculate a float separation between the first and second floats; and
   a means to adjust the adjustable arm to correspond to the calculated float separation.

17. The device according to claim 13, wherein the common pivot (204) is connected to a structure (206) by at least one compressible element (212) to harvest translational motion of the common pivot (204) relative to the structure (206) due to wave motion.

18. The device according to claim 17, wherein the at least one compressible element (212) comprises any of a spring mechanism and a hydraulic mechanism storing potential energy created by each compression in order to extend and return the common pivot (204) to an original vertical position once the vertical perturbation of the surface of the water body is passed.

19. The device according to claim 17, wherein each of the at least one compressible element (212) is oriented with respect to the structure (206) to vary motion of the common pivot (204), with respect to the structure (206), based on one or more environmental conditions.

20. The device according to claim 13, wherein a plurality of said pivots, each connected with two corresponding floats, is connected with a common structure.

21. The device according to claim 20, wherein all the floats connected with said plurality of pivots, in combination, contributes buoyancy to keep the structure afloat.

22. The device according to claim 21, wherein the structure's predominant source of buoyancy force is said floats.

23. The method according to claim 9, wherein the structure's predominant source of buoyancy force is said floats.

24. The device according to claim 20, wherein the structure is a vessel.

25. The device according to claim 20, wherein plurality of pivots is provided on the structure (206) is fitted on a frame (306) having a set of connections of adjustable length between an adjacent pivot for controlling separation between the pivots.

26. The device according to claim 20, wherein at least one pivot and its corresponding two float connections, in combination, is detachable from a frame (306) to facilitate adaptation of the structure (206) to different weights and conditions.

\* \* \* \* \*